(12) United States Patent
Radziwon et al.

(10) Patent No.: US 6,540,347 B1
(45) Date of Patent: Apr. 1, 2003

(54) SIDE SHIELD WITH SNAP-IN RETENTION CLIP

(75) Inventors: Norman J. Radziwon, Rochester, NY (US); Nicola S. Verdino, Rochester, NY (US)

(73) Assignee: ArtCraft New York, Rochester, NY (US)

( * ) Notice: Subject to any disclaimer, the term of this patent is extended or adjusted under 35 U.S.C. 154(b) by 0 days.

(21) Appl. No.: 10/143,068

(22) Filed: May 10, 2002

(51) Int. Cl.⁷ ................................................. G02C 7/10
(52) U.S. Cl. ...................................... 351/41; 2/12; 2/13
(58) Field of Search .......................... 351/44, 41; 2/12, 2/13

(56) References Cited

U.S. PATENT DOCUMENTS

| | | | |
|---|---|---|---|
| 3,721,490 A | * 3/1973 | Prince | 351/44 |
| 5,548,351 A | * 8/1996 | Hirschman et al. | 351/44 |
| 5,748,278 A | 5/1998 | Simmons, Sr. | 351/44 |
| 5,798,815 A | 8/1998 | Hirschman et al. | 351/44 |
| 6,007,196 A | 12/1999 | Saba et al. | 351/44 |

* cited by examiner

Primary Examiner—Hung Xuan Dang
(74) Attorney, Agent, or Firm—Eugene Stephens & Associates; Steven R. Scott

(57) ABSTRACT

This eyeglass side shield with a snap-in locking member is generally intended for use with eyeglass temples having expanded padding or inserts around and extending forwardly from its ear hook. The side shield is provided with retention ridges abutting a trough formed in the material of the side shield. This trough has a generally "C" shaped cross-section and can be slid onto an eyeglass temple from the front rather than the rear. After placement in position, the snap-in locking member provides an obstruction that prevents the eyeglass shield from being slid forward past the hinge casing for the eyeglass temple. It also serves to further block movement of the eyeglass shield backward past the expanded padding or inserts.

24 Claims, 7 Drawing Sheets

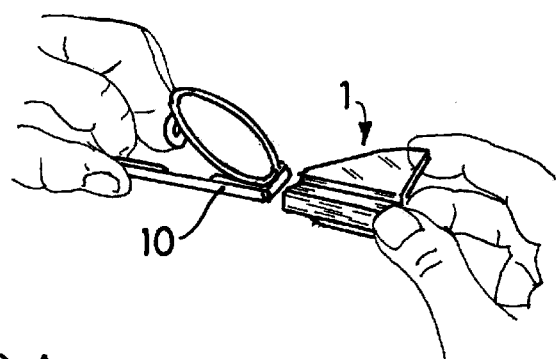
FIG. 2A
FIG. 2B
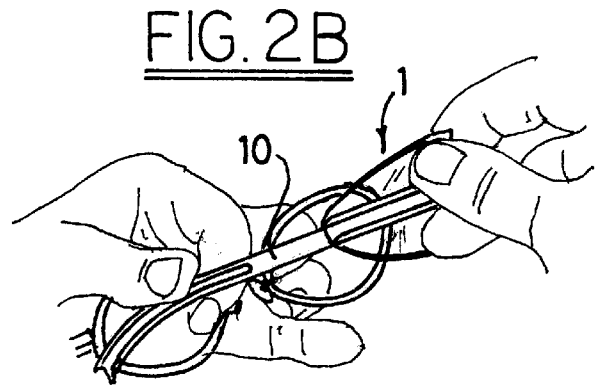
FIG. 2C
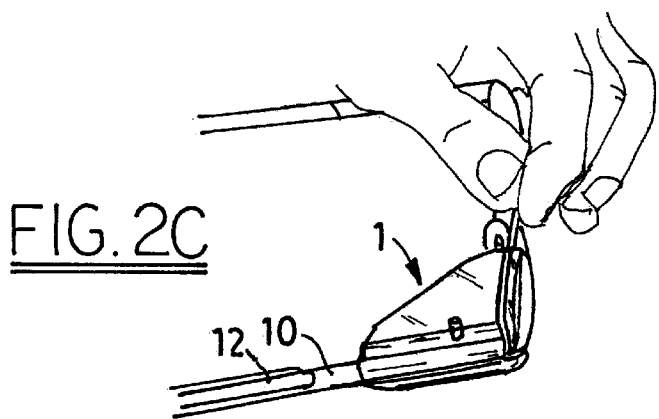

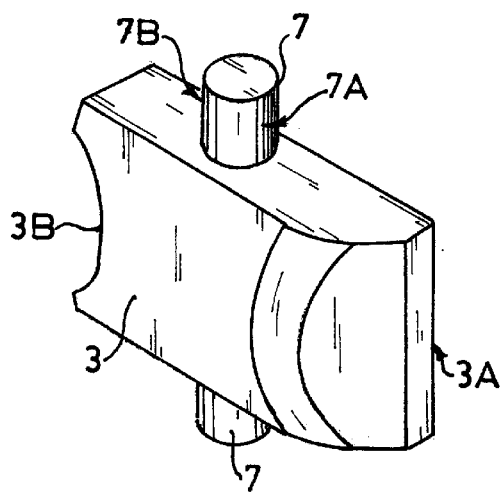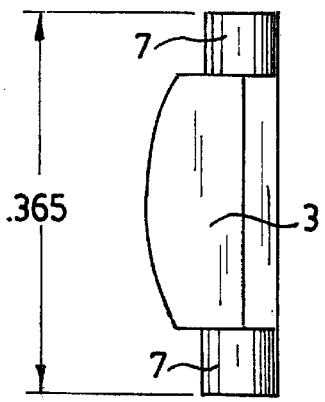
FIG. 6
FIG. 7
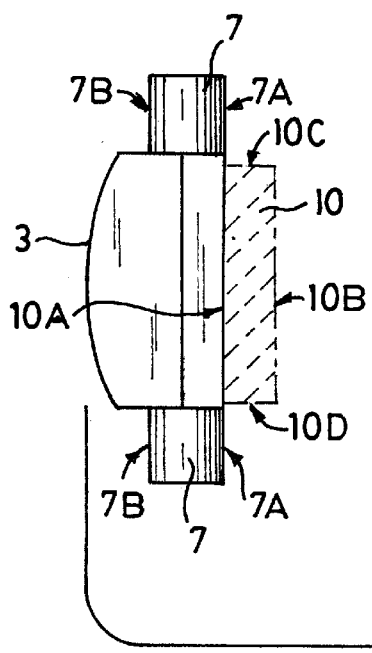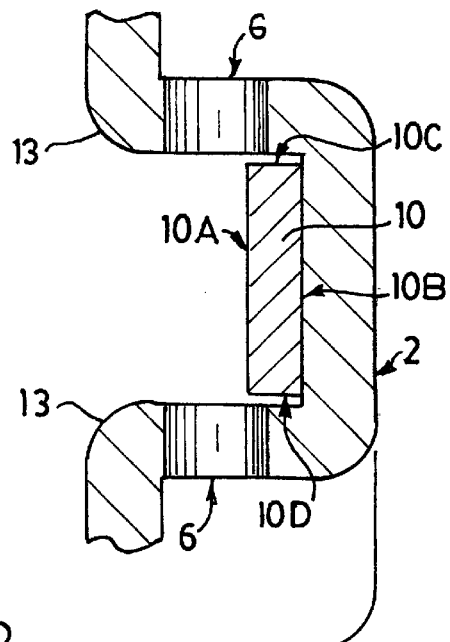
FIG. 8

SIDE SHIELD WITH SNAP-IN RETENTION CLIP

TECHNICAL FIELD

This invention deals with side shields for eyeglasses.

BACKGROUND OF THE INVENTION

Side shields may be mounted to the temples of safety eyeglass frames to help shield the wearer from dangerous materials that could enter the eye in a particular work environment. In fact, employers often provide employees working in such environments with their own personal prescription eye glasses having side shields at no cost in order to safeguard their workers' health and productivity. Unfortunately, many workers are tempted to remove the side shields when not in the workplace in order to make their eyeglasses appear more stylish or appealing. This leads to the loss of the side shields provided and often leads to the worker attempting jobs where safety requires the presence of such side shields without the shields being present.

In order to prevent the removal and loss of side shields, employers and manufacturing facilities have sought means for permanently affixing side shields to the temples of the eyeglasses provided to their employees. Mechanical locking means (such as rivets, screws and lock-nuts) as well as adhesives have been used for this purpose. Representative examples of prior art attempts to solve this problem using mechanical locking means may be seen in the following U.S. Patents:

U.S. Pat. No. 5,548,351 issued to Hirschman et al. in 1996 for a "Method and Kit for Attaching Side Shields to Eyeglass Temples."

U.S. Pat. No. 5,748,278 issued to Simmons, Sr. in 1998 for a "Eyeglass Shield for Removable Attachment to Eyeglass Lens Frames."

U.S. Pat. No. 5,798,815 issued to Hirschman et al. in 1998 for a "Method and Kit for Attaching Side Shields to Eyeglass Temples."

U.S. Pat. No. 6,007,196 issued to Saba et al. in 1999 for a "Retainer for Eyeglass Frames having Sideshields."

Most of the foregoing patents deal with systems that require a specialized eye glass side shield for their use. Other systems, such as Saba, are intended for use with a common rear slide-on shield. Such shields are placed in position by sliding them into place (from the rear) onto and over the temple adjacent the lens frame. They can be removed by reversing this process and sliding them back from their position. Thus, some mechanism must be provided to block them from sliding back from the end of the temple adjacent the lens frame. For example, Saba provides a hook that fastens into a side hole or opening in the eyeglass shield. This hook is at one end of an arm with the other end attached to a clamp that can be tightened onto the temple behind the shield after the shield is in position. This combination allows the eyeglass shield to be locked into position so that it cannot slide off of the temple.

However, not all eyeglass temples are structured in a way that allows a side shield to slide onto the temple from the rear. Some brands, such as VECTORS®, have expanded padding or inserts on or around the rear of the temple adjacent and forward of the temple's ear hook. This added material generally covers both the inside and outside of the temple and thereby blocks side shield placement from the rear. Thus, side shield designs adapted for placement by sliding onto the temple from the rear cannot be used. There is, therefore, a need for eyeglass side shield systems that can be used with such glasses. There also remains a need for side shield systems that are durable, reliable and simple to actuate.

SUMMARY OF THE INVENTION

The instant invention involves an eyeglass side shield with a snap-in locking member. The eyeglass side shield is provided with retention ridges that form an open slot. This slot allows the shield to slide onto an eyeglass temple from the front rather than the rear. After placement in position, a snap-in locking member provides an obstruction that prevents the eyeglass shield from sliding forward past the hinge casing for the eyeglass temple. It also serves to further block movement of the eyeglass shield backward past the padding inserts for the temple's ear hook. The design is durable, reliable and simple to put into place.

DESCRIPTION OF THE DRAWINGS

FIG. 2A provides a first sequence shot showing my eyeglass shield as it is about to be slid onto an eye glass temple from the front.

FIG. 2B provides a second sequence shot showing my eyeglass shield as it is being slid onto an eye glass temple from the front.

FIG. 2C provides a third sequence shot showing my eyeglass shield after it has been slid onto an eye glass temple from the front.

FIG. 6 provides an enlarged perspective view of a second preferred embodiment of my snap-in retainer.

FIG. 7 provides a front edge view of the second preferred embodiment of my snap-in retainer.

FIG. 8 provides an enlarged rear edge view of a portion of the second preferred embodiment of my eyeglass side shield and snap-in retainer prior to the retainer being snapped into place on said eyeglass side shield.

DESCRIPTION OF THE INVENTION

Figure 1A:
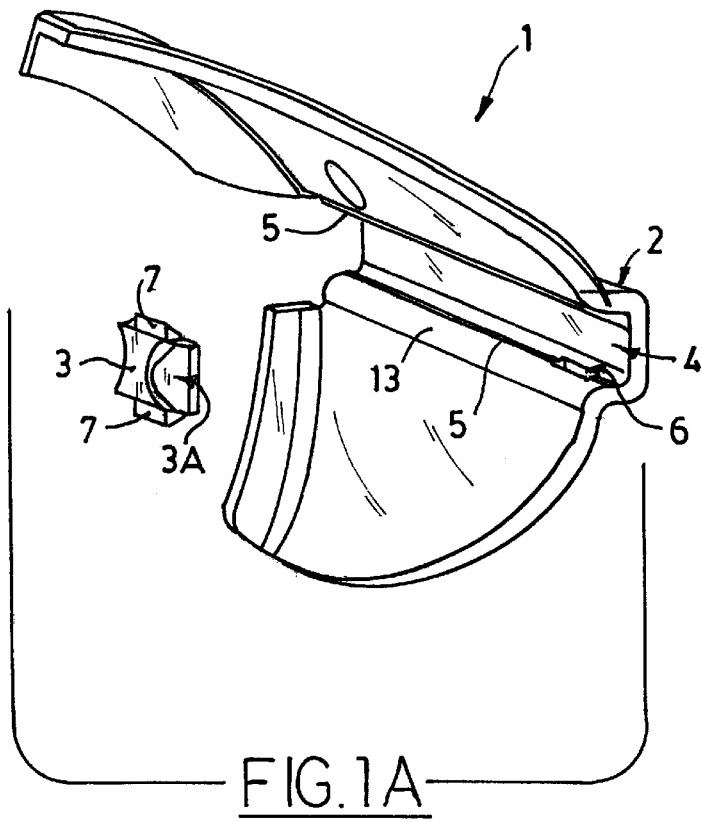
FIG. 1A provides a perspective view of a first preferred embodiment of my eyeglass side shield with a snap-in retainer prior to being snapped into place on said eyeglass side shield.

My side shield with snap retainer is based upon a side shield (denoted generally by arrow 1) having a generally linear temple engaging portion (denoted generally by arrow 2) and an insertable retention clip 3. Temple engaging portion 2 has an open end 4 at its rear by which it can be inserted over an eyeglass temple 10 from the front. My invention is intended primarily for use with temples 10 that have expanded padding or inserts 11 on or around the rear of the temple 10 adjacent and forward of the temple's ear hook on both the inside 10A and the outside 10B of the temple 10. This added material is generally considered to be a disadvantage in attaching side shields as it blocks side shield placement from the rear. Thus, the usual side shield designs, which are adapted for placement by sliding onto the temple from the rear, cannot be used. However, in my invention I turn this feature into an advantage. Since the expanded padding 11 on the temple 10 blocks removal of the side shield 2 from the rear as well as blocking insertion from the rear, I have developed a side shield 1 that slides onto the temple from the front and has a retention clip 3 that prevents it from being removed along this same route once it has been locked into position.

This system works simply and efficiently as the temples 10 my invention is intended to fit (like most temples) have a hinge casing 12 at the front end of the temple opposite the aforesaid ear hook. The hinge casing 12 adds an obstruction on the inside 10A of the temple 10, but leaves clearance at the top edge 10C and bottom edge 10D of the temple 10 as well as along its outside 10B proximate the front end of the temple. Thus, in my invention, temple-engaging portion 2 is formed as a linear trough in side shield 1. Retention ridges 5 abut temple-engaging portion 2 giving it a generally "C" shaped cross-section in the regions where said retention ridges 5 are located. These retention ridges 5 abut the inside 10A of the temple and prevent the side shield 1 from being pulled off by moving it directly away from the outside 10B of the temple 1. This leaves only one route for placement or removal of side shield 1: It must be slid onto the temple 10 via open end 4.

Figure 1B:
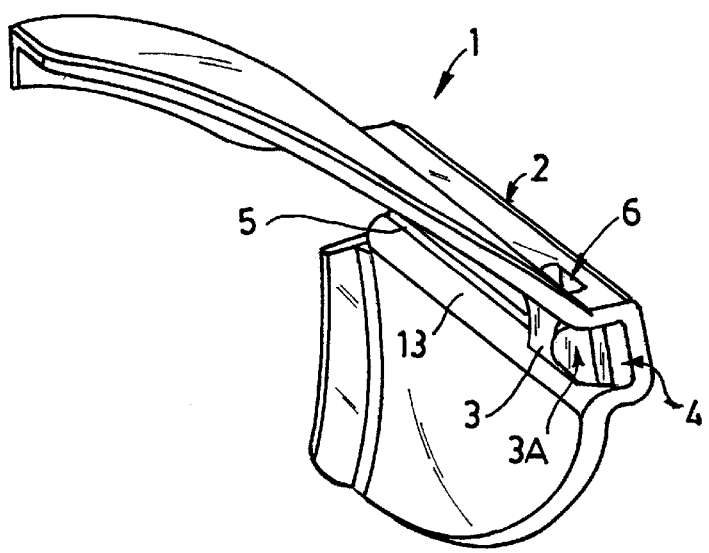
FIG. 1B provides a perspective view of the first preferred embodiment of my eyeglass side shield with its snap-in retainer snapped into place.
Figure 1C:
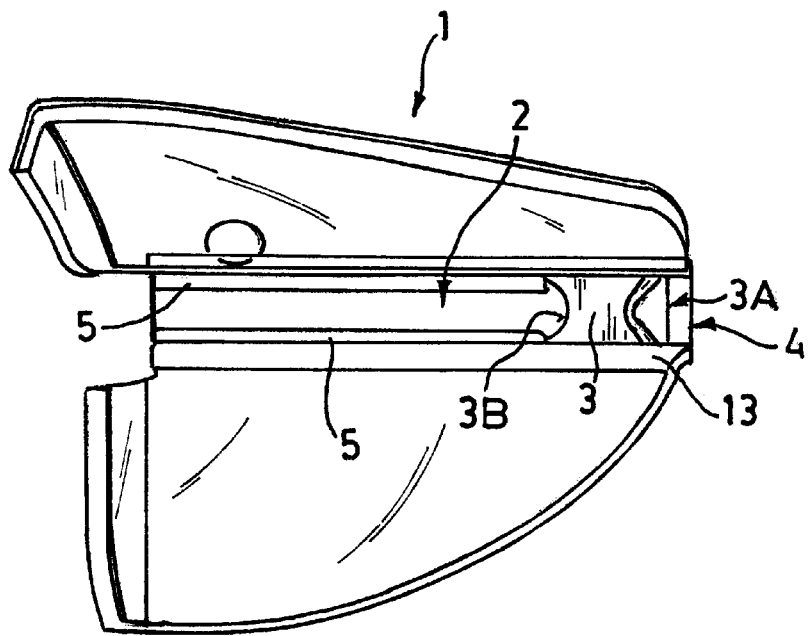
FIG. 1C provides a second perspective view of the first preferred embodiment of my eyeglass side shield with its snap-in retainer snapped into place.
Figure 1D:
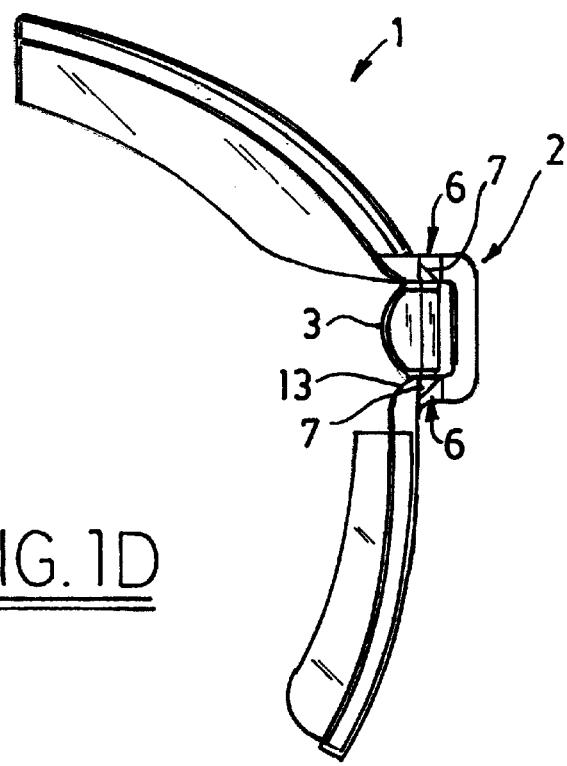
FIG. 1D provides a rear side edge view of the first embodiment of my eyeglass side shield with snap-in retainer after being snapped into place on said eyeglass side shield.
Figure 3:
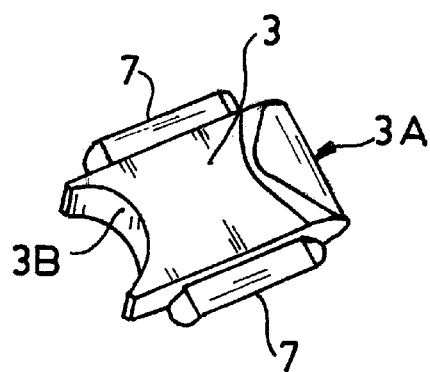
FIG. 3 provides an enlarged perspective view of the first preferred embodiment of my snap-in retainer.
Figure 4:
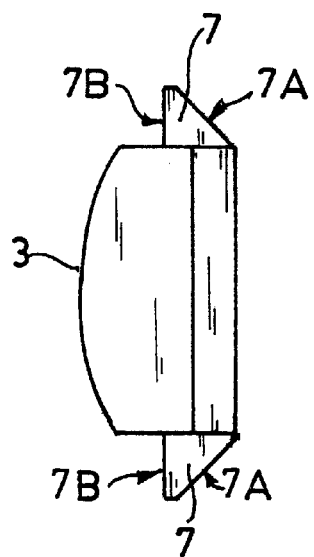
FIG. 4 provides a front edge view of the first preferred embodiment of my snap-in retainer.
Figure 5:
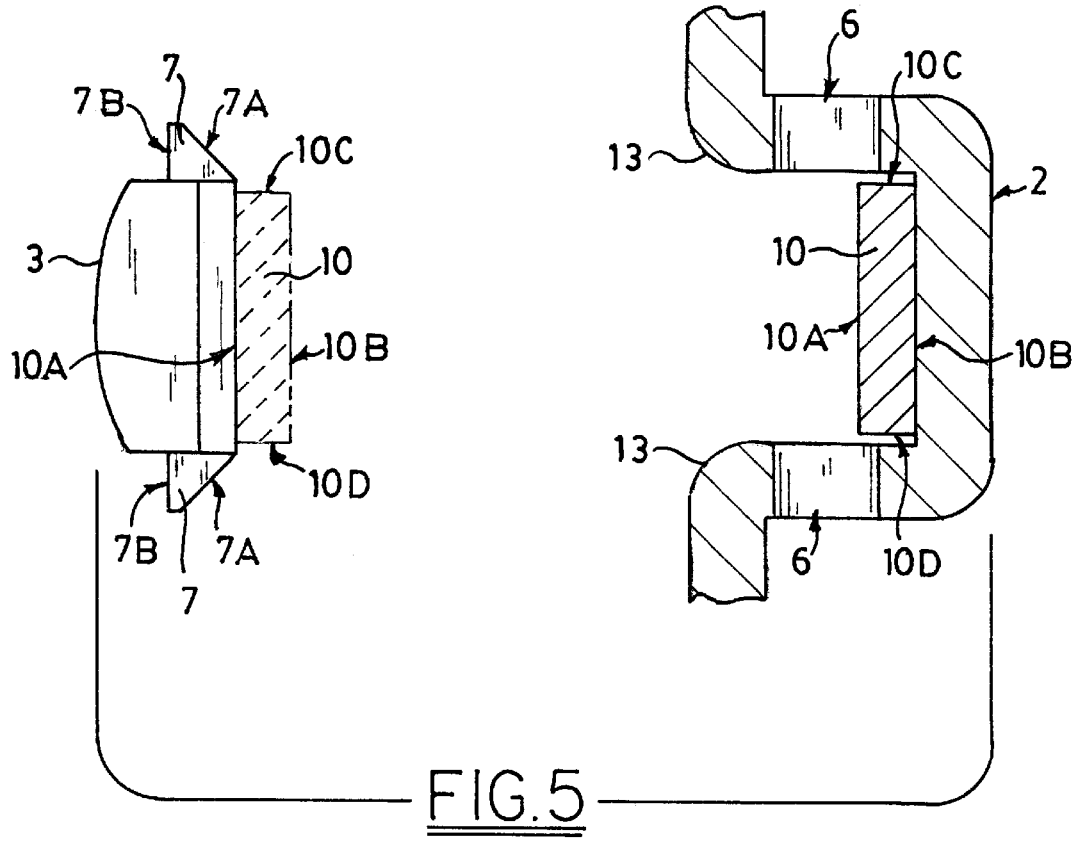
FIG. 5 provides an enlarged rear edge view of a portion of the first embodiment of my eyeglass side shield and snapin retainer prior to the retainer being snapped into place on said eyeglass side shield.
Figure 9:
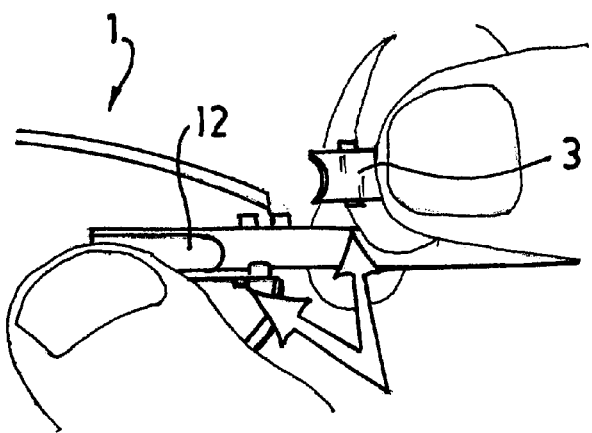
FIG. 9 provides a perspective view showing the second preferred embodiment of my eyeglass side shield in place on an eyeglass temple with a user positioning its snap-in retainer prior to placement.
Figure 10:
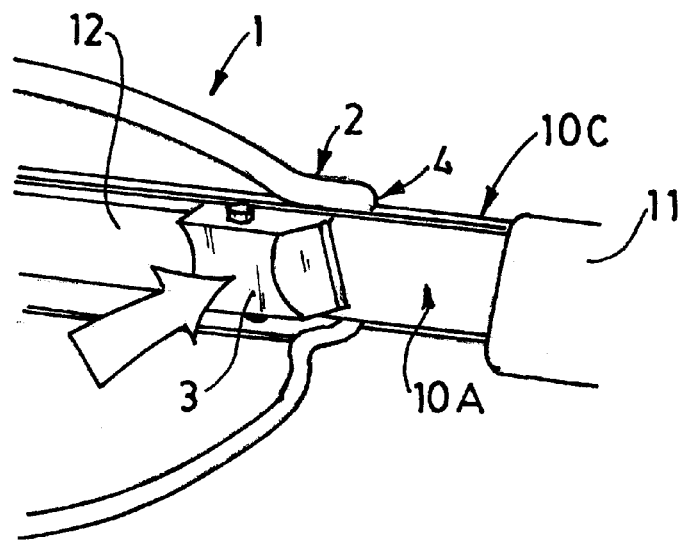
FIG. 10 provides a perspective view showing the second preferred embodiment of my eyeglass side shield in place on an eyeglass temple with its snap-in retainer positioned for placement.

Once my side shield 1 has been slid into position, snap retainer/retention clip 3 can be snapped into the spaces 6 provided in side shield 1 adjacent temple-engaging portion 2. This is assisted by the curved inside juncture 13 of the side shield 1 adjacent temple engaging portion 2. The curvature of juncture 13 helps the extensions 7 of each retention clip ramp into the spaces 6 provided therefor. The retention clip 3 illustrated in FIGS. 1A through 1D and FIGS. 3 through 5 also has an extra feature to assist in this process: it is provided with extensions 7 that have inner inclined faces 7A that further help in ramping extensions 7 into spaces 6. After insertion, the outer non-inclined faces 7B of both embodiments make them difficult or impossible to withdraw from spaces 6 once they are place in position. Once in place, they firmly abut an eyeglass temple 10 placed into temple engaging portion 2, pressing it firmly into said portion. The rear edge 3A of retention clip 3 further blocks its removal by sliding over the expanded material 11 to the rear of the side shield 1 on the temple, while front edge 3B of clip 3 blocks its removal by sliding past the hinge casing 12 at the front of side shield 1.

In the preferred embodiment illustrated, side shield 1 and retention clip 3 are formed from molded plastic materials. However, metal reinforcing members can be provided within these molded parts if additional strength is desired. Other and additional variations in my invention are possible without exceeding the scope of its underlying inventive concepts. It should, therefore, be understood that my Side Shield With Snap Retainer in any of its aspects can be incorporated in many different constructions. Thus, the generality of the claims that follow is not to be superseded by the particularity of the foregoing description or the attached drawings. Many alterations, modifications, and/or additions can be made without exceeding the ambit of the following claims.

We claim:

1. A side shield with snap retainer, comprising:
   a. a side shield having a generally linear temple engaging portion formed as a linear trough in said side shield, said linear trough having one open side with two opposing closed sides and one closed side connecting said opposing closed sides opposite said open side, and said linear trough having an open end by which the linear trough can be inserted over an eyeglass temple; and
   b. a retention clip adapted for insertion into the open side of the linear trough towards the closed side connecting the opposing closed sides of said linear trough in said side shield to prevent the withdrawal of an eyeglass temple from said linear trough, said retention clip snapping into engagement with said side shield without passing through said side shield.

2. A side shield with snap retainer as set forth in claim 1, wherein the two opposing closed sides abut remaining side shield portions at curved junctures and said curved junctures assist the retention clip in snapping into engagement with said side shield.

3. A side shield with snap retainer as set forth in claim 2, wherein said trough includes portions having a generally C shaped cross-section.

4. A side shield with snap retainer as set forth in claim 3, wherein retention ridges abutting said trough form part of said portions having a generally C shaped cross-section.

5. A side shield with snap retainer as set forth in claim 2, further including retention ridges abutting said linear trough.

6. A side shield with snap retainer as set forth in claim 1, wherein said linear trough includes portions having a generally C shaped cross-section.

7. A side shield with snap retainer as set forth in claim 3, wherein retention ridges are part of said portions having a generally C shaped cross-section.

8. A side shield with snap retainer as set forth in claim 1, further including retention ridges abutting said linear trough.

9. A side shield with snap retainer as set forth in claim 1, wherein said snap retainer has extensions that snap into spaces provided in said side shield.

10. A side shield with snap retainer as set forth in claim 9, wherein said extensions have an inclined face, for ramping into said spaces and facilitating insertion, and a non-inclined face opposite said ramped face, making them difficult to withdraw from said spaces.

11. A side shield with snap retainer, comprising:
    a. a side shield having a generally linear temple engaging portion formed as a linear trough in said side shield, said linear trough having one open side with two opposing closed sides and one closed side connecting said opposing closed sides opposite said open side, the two opposing closed sides abutting remaining side shield portions at curved junctures, and said linear trough having an open end by which the linear trough can be inserted over an eyeglass temple; and
    b. a retention clip adapted for insertion into the open side of the linear trough towards the closed side connecting the opposing closed sides of said linear trough in said side shield to prevent the withdrawal of an eyeglass temple from said linear trough, said retention clip having extensions that snap into spaces provided in said side shield, the extensions being assisted in snapping into said spaces by the curved junctures.

12. A side shield with snap retainer as set forth in claim 11, wherein said linear trough includes portions with a generally C shaped cross-section and wherein retention ridges abutting said trough form part of said portions having a generally C shaped cross-section.

13. A side shield with snap retainer as set forth in claim 11, wherein said snap retainer has extensions that snap into openings provided in said side shield.

14. A side shield with snap retainer as set forth in claim 11, wherein said extensions have an inclined face, for ramping into said spaces and facilitating insertion, and a non-inclined face opposite said ramped face, making them difficult to withdraw from said spaces.

15. A side shield and eyeglass temple combination, the combination comprising:
   a. an eyeglass temple;
   b. a side shield having a generally linear temple engaging portion formed as a linear trough in said side shield, said linear trough having one open side with two opposing closed sides and one closed side connecting said opposing closed sides opposite said open side, the two opposing closed sides abutting remaining side shield portions at curved junctures, and said linear trough having an open end by which the linear trough can be inserted over the eyeglass temple; and
   b. a retention clip adapted for insertion into the open side of the linear trough towards the closed side connecting the opposing closed sides of said linear trough in said side shield to prevent the withdrawal of the eyeglass temple from said linear trough, said retention clip snapping into engagement with said side shield and being assisted in snapping into engagement by the curved junctures.

16. A side shield with snap retainer as set forth in claim 15, wherein said retention clip snaps into engagement with said side shield without passing through said side shield.

17. A side shield with snap retainer as set forth in claim 16, wherein said trough includes portions having a generally C shaped cross-section.

18. A side shield with snap retainer as set forth in claim 17, wherein retention ridges abutting said trough form part of said portions having a generally C shaped cross-section.

19. A side shield with snap retainer as set forth in claim 16, further including retention ridges abutting said linear trough.

20. A side shield with snap retainer as set forth in claim 15, wherein said linear trough includes portions having a generally C shaped cross-section.

21. A side shield with snap retainer as set forth in claim 20, wherein retention ridges are part of said portions having a generally C shaped cross-section.

22. A side shield with snap retainer as set forth in claim 15, further including retention ridges abutting said linear trough.

23. A side shield with snap retainer as set forth in claim 15, wherein said snap retainer has extensions that snap into spaces provided in said side shield.

24. A side shield with snap retainer as set forth in claim 23, wherein said extensions have an inclined face, for ramping into said spaces and facilitating insertion, and a non-inclined face opposite said ramped face, making them difficult to withdraw from said spaces.

* * * * *